UNITED STATES PATENT OFFICE.

CARL ULSTRUP DAHLE, OF FREDRIKSVÆRN, NORWAY, ASSIGNOR TO MESSRS. NYEGAARD & CO., OF CHRISTIANIA, NORWAY.

PROCESS OF PRODUCING A SOLUBLE, DIGESTIBLE, AND EASILY-ASSIMILATED ALBUMIN.

1,048,949. Specification of Letters Patent. Patented Dec. 31, 1912.

No Drawing. Application filed November 1, 1911. Serial No. 657,981.

*To all whom it may concern:*

Be it known that I, CARL ULSTRUP DAHLE, a subject of the King of Norway, residing at Fredriksværn, Norway, have invented certain new and useful Improvements in Processes of Producing a Soluble, Digestible, and Easily-Assimilated Albumin; and I do hereby declare the following to be a full, clear, and exact description of the invention, such as will enable others skilled in the art to which it appertains to make and use the same.

This invention has for its object a process of producing a soluble, digestible and easily assimilated albumin by means of "peptonizing" casein or other simple or compound proteids without the aid of pepsin or other enzyms.

The process is based upon an observation made by applicant that a peptonization of the proteid takes place without the aid of pepsin when the proteid is subjected to a high temperature in the presence of a chlorid of an alkali forming metal, such as common salt, chlorid of potassium.

As an example of how the process may be carried out the treatment of casein is described in the following: The casein is firstly mixed with a suitable chlorid of an alkaline metal for instance sodium chlorid (5 per cent. of sodium chlorid will be sufficient). If required a glycerophosphate as for instance sodium glycerophosphate may be added. The substances may be mixed together in a dry state or in solution. The mixture obtained is then heated to a temperature of about 105–125 centigrade for some time depending to some degree on the temperature used. The heating operation may take place under ordinary pressure. After some time (about an hour) chemical tests will show that hydrolyzation has taken place. As is well known, hydrolyzation cannot take place without the presence of moisture. I usually add to the chlorid sufficient water to form a pasty mass. If the substances, however, are mixed in a dry state it is necessary to make use of a moist heat; this moisture and the water usually bound to the casein will secure the formation of the hydroxyl groups.

It is of importance that the heating operation shall not last too long, because in such case there may be formed in the mass hard grains, consisting of insoluble casein, the reason for this being that according to applicant's observations the casein is not completely but only partly hydrolyzed by the stated treatment.

The product obtained by the above described process is soluble, digestible and possesses the property of being easily assimilated.

Under the physical conditions above described consisting in heating a proteid to a suitable temperature in the presence of for instance chlorid of sodium all albumins and albumin derivates combine with the salt (acid and base as cation and anion) hydroxyl groups being absorbed. The quantitative action varies according to whether the proteid in question is of a basic or acid character. The phosphorus-proteid, casein, is a marked acid proteid which appears to be specifically fit for the hydrolyzation process as above described; the process may be employed for the treatment not only of simple proteids but also of conjugated proteids.

Instead of combining the present hydrolyzation process with the production of compounds, containing glycerophosphates, as above described, the treatment may take place in connection with the production of compounds containing other ingredients. The hydrolyzation of the albumin may also be carried out as an independent process with the exclusion of other substances or the admixture of other substances such as medicines (iron compounds or the like) may take place after the hydrolyzation treatment.

I claim.

1. The process of producing easily digestible proteid preparations, which comprises hydrolyzing a proteid by subjecting it for some time to moist heat in the presence of a chlorid of an alkali forming metal.

2. The process of producing easily digestible proteid preparations which consists in subjecting casein for some time to a temperature of between 105 and 125 centigrade in the presence of chlorid of sodium.

3. The process of producing easily digestible proteid preparations, which consists in subjecting a proteid for some time to an elevated temperature together with a chlorid of an alkali forming metal and one or more glycerophosphates.

4. The process of producing easily digestible proteid preparations, which comprises hydrolyzing a proteid by mixing it in a dry state with a chlorid of an alkali forming metal and subjecting the mixture to a moist heat for some time.

5. The process of producing easily digestible proteid preparations, which comprises hydrolyzing a proteid by subjecting it for some time to moist heat in the presence of chlorid of sodium and one or more glycerophosphates.

In testimony that I claim the foregoing as my invention, I have signed my name in presence of two subscribing witnesses.

CARL ULSTRUP DAHLE.

Witnesses:
M. GUTTORMSEN,
AUG. OLSEN.